United States Patent Office 3,641,010
Patented Feb. 8, 1972

3,641,010
NOVEL XANTHINE COMPOUNDS AND MEANS FOR OBTAINING THE SAME
Dieter Schweiss and Loren M. Long, Ann Arbor, Mich., assignors to Parke, Davis & Company, Detroit, Mich.
No Drawing. Continuation-in-part of application Ser. No. 846,594, July 30, 1969. This application June 11, 1970, Ser. No. 45,594
Int. Cl. C09b 23/14; C07d 57/40
U.S. Cl. 260—240 D    6 Claims

ABSTRACT OF THE DISCLOSURE 1,3-dialkyl-7-methyl-8-styrylxanthines (I)

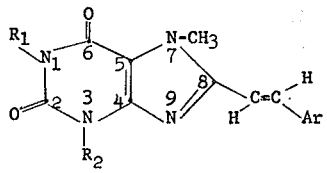

are provided by N-alkylation of corresponding compounds at either the 1-position or the 7-position; where $R_1$ and $R_2$ are methyl or ethyl and Ar is phenyl or 3,4,5-trimethoxyphenyl. The compounds are cerebral stimulants of the caffeine type.

SUMMARY AND DETAILED DESCRIPTION

This application is a continuation-in-part of our copending application Ser. No. 846,264 filed July 30, 1969.

The invention relates to novel xanthine compounds and methods for obtaining the same. More particularly, the invention relates to novel 1,3-dialkyl-7-methyl-8-styrylxanthine compounds having the formula

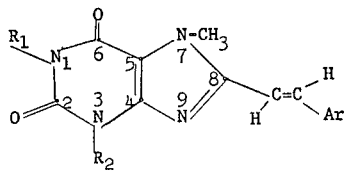

where $R_1$ and $R_2$ are the same or different and represent methyl or ethyl, and Ar is a phenyl or 3,4,5-trimethoxyphenyl group.

According to one process embodiment of the invention, the compounds of Formula I are obtained by methylation of the corresponding styrylxanthine compounds of formula

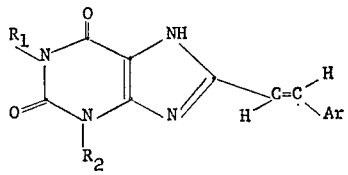

where $R_1$, $R_2$ and Ar are defined as stated above. The reaction is carried out using a methylating agent in the presence of base in a suitable solvent. As methylating agent methyl halides and methyl sulfate may be used. Methyl sulfate is a preferred methylating agent. At least one equivalent of the methylating agent is used in the reaction. A moderate excess and particularly a 3- to 5-fold excess is preferred. Suitable bases for the reaction are the alkali metal carbonates or hydroxides. Sodium or potassium hydroxide is preferred. Sufficient base is used to maintain the reaction on the basic side, conveniently at a pH of about 8–9. Some of the many solvents which can be used for the reaction include water, lower alkanols, dioxane, ethylene glycol, excess methylating agent and the like. A preferred solvent is one which affects a homogeneous reaction mixture such as aqueous methanol or ethanol. The methylation is carried out at ordinary temperature, preferably up to about 45° C. At this temperature range, and according to a preferred procedure using aqueous alkanol, methylation is complete within two hours once the homogeneous reaction mixture is obtained. In general, low temperatures are preferred in order to avoid production of unwanted by-products and consequent lowered yields of the desired product. Using the indicated reaction conditions the product can be easily isolated by filtration.

According to another process, the compounds of Formula I are obtained by alkylation of the corresponding styrylxanthine compounds of formula

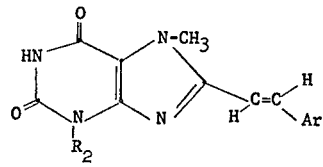

where $R_2$ and Ar are defined as stated above. The reaction is carried out using an alkylating agent in the presence of base in a suitable solvent. As alkylating agent a methyl or ethyl halide or sulfate may be used. An alkyl halide such as methyl or ethyl iodide is a preferred methylating agent. At least one equivalent of the alkylating agent is used in the reaction. A moderate excess and particularly a 4- to 8-fold excess is preferred. Suitable bases for the reaction are the alkali metal carbonates or hydroxides. Sodium or potassium hydroxide is preferred. Sufficient base is used to maintain the reaction basic and preferably moderately basic. Solvents which can be used for the reaction include water, lower alkanols, and aqueous alkanol mixtures. Aqueous methanol or ethanol is preferred. The reaction time and temperature are subject to considerable variation. In general, depending on the reaction conditions chosen, temperatures ranging from 0 to 100° C. may be used for periods ranging up to 24 hours. Preferred temperatures are from 60 to 85° C. in which range the reaction is complete in two to five hours. The product can be easily isolated from the reaction mixture by extraction with an appropriate organic solvent such as methylene chloride.

The compounds of the invention possess pharmacological activity and are useful cerebral stimulants of the caffeine type. The action is generally more pronounced than that of caffeine as determined by standard pharmacological tests such as the "jiggle-cage" test. The compounds are well-tolerated and can be used over a wide dosage range with relatively little over-stimulation and post-stimulating depression. This action is unlike caffeine which notoriously is associated with after-depression and loss of stimulation of high dosage levels.

The invention is illustrated by the following examples.

Example 1

(a) A solution of 19.8 g. of 8-styryltheophylline and 350 ml. of 1 N sodium hydroxide stirring vigorously at room temperature, is treated dropwise with 35 ml. of dimethyl sulfate over a period of one-half hour. Once precipitation appears, an additional 100 ml. of 1 N sodium hydroxide is stirred into the mixture. One-half hour later, the product 8-styrylcaffeine separates as a solid and is collected by filtration and washed with water and cold methanol; M.P. 220–221° C. after recrystallization from ethanol-water.

(b) The starting material for the procedure of paragraph (a) can be prepared as follows:

A mixture of 18.4 g. of 6-amino-1,3-dimethyl-5-nitrosouracil, 12.6 ml. of cinnamaldehyde, 150 ml. of dimethylformamide, and 5 ml. of 90% formic acid is stirred at reflux three hours and then treated with an additional 5 ml. of 90% formic acid. Three hours later, the resulting mixture is allowed to cool for filtration. The product 8-styryltheophylline is collected, washed with dimethylformamide and ethanol, and dried in vacuo at 100° for four hours; M.P. >340° C.

Example 2

(a) A solution of 38.5 g. of 8-(3,4,5-trimethoxystyryl)theophylline, 200 ml. of methanol, 200 ml. of water and 150 ml. of 1 N sodium hydroxide is stirred at 45° C. during which 10 ml. of dimethyl sulfate is added dropwise. Once precipitation appears, an additional 23 ml. of dimethyl sulfate and 230 ml. of 1 N sodium hydroxide are simultaneously added over a period of one hour while maintaining the mixture at pH 8–9. The resulting mixture is allowed to stir one more hour at room temperature and then treated with 50 ml. of 1 N sodium hydroxide. The product which separates is collected by filtration, washed with water, and then dissolved in 400 ml. of hot dimethylformamide. After filtration, the solution is diluted with 130 ml. of ethanol and cooled. The product, 8-(3,4,5-trimethoxystyryl)caffeine, is collected by filtration, washed with ethanol and water and dried in vacuo at 100° C. for eight hours; M.P. 245–247° C.

(b) A solution of 37.6 g. of 5,6-diamino-1,3-dimethyluracil, monohydrate, and 400 ml. of pyridine stirring at 0–5°, is treated dropwise with a solution of 51.3 g. of 3,4,5-trimethoxycinnamoyl chloride and 160 ml. of dry dioxane. The resulting mixture is allowed to stir at room temperature overnight and then concentrated in vacuo Trituration of the residue with a mixture of 800 ml. of water and 50 ml. of concentrated ammonium hydroxide yields a white solid, which is washed with water and ether and then suspended in a mixture of 350 ml. of 1 N sodium hydroxide and 450 ml. of methanol. After stirring at reflux for two hours, the resulting pale yellow solution is acidified by dropwise addition of 30 ml. of acetic acid. The product, 8-(3,4,5 - trimethoxystyryl)theophylline, is obtained on cooling; M.P. >330° C. after washing with 50% aqueous methanol and drying in vacuo at 80° C. overnight.

Example 3

(a) A solution of 3.1 g. of 1,3-diethyl-8-styrylxanthine, 50 ml. of 1 N sodium hydroxide, 50 ml. of methanol, and 30 ml. of water is stirred at 0° C. for addition of 4.5 ml. of dimethyl sulfate. After stirring an additional hour at the same temperature, the mixture is stirred one hour at room temperature. The product, 1,3-diethyl-7-methyl-8-styrylxanthine, is obtained by filtration; M.P. 162–164° C. after recrystallization from a mixture of 150 ml. of ethanol, 100 ml. of water, 10 ml. of 1 N sodium hydroxide and drying in vacuo at 100° C. for four hours.

(b) The starting material for paragraph (a) is obtained as follows:

A mixture of 21.2 g. of 6-amino-1,3-diethyl-5-nitrosouracil and 250 ml. of saturated aqueous sodium acetate is stirred vigorously at room temperature while 35 g. of sodium dithionite is added in two portions. As the resulting mixture warms up, it becomes a colorless solution which is cooled to 0° C. for dropwise addition of a solution of 16.7 g. of cinnamoyl chloride in 70 ml. of dioxane. After stirring an hour at 0–5° and overnight at room temperature, this mixture is treated with 200 ml. of water. A white solid is filtered, washed with water and then mixed with 250 ml. of 1 N sodium hydroxide and 250 ml. of methanol. The resulting suspension is stirred at reflux for about two hours until a clear solution of the sodium salt results at which point it is treated dropwise with a mixture of 20 ml. of glacial acetic acid in 100 ml. of water. On cooling, the product, 1,3-diethyl-8-styrylxanthine, is collected; M.P. 316–318° C. after washing with 50% methanol and drying overnight in vacuo at 90°.

Example 4

(a) Over a period of thirty minutes, 20 ml. of dimethyl sulfate is added dropwise to a solution of 16 g. of 1,3-diethyl-8-(3,4,5 - trimethoxystyryl)xanthine, 200 ml. of 1 N sodium hydroxide, and 100 ml. of ethanol stirring at room temperature. After two hours, the resulting mixture is further treated with 100 ml. of 1 N sodium hydroxide and allowed to stir another hour. The precipitate collected by filtration is washed with 10% ammonium hydroxide and water and recrystallized from dimethylformamide-water. The product is 1,3 - diethyl-7-methyl-8-(3,4,5-trimethoxystyryl)xanthine; M.P. 212–214° C. after drying in vacuo at 80° overnight.

(b) The starting material is prepared as follows:

To a vigorously stirring solution of 21.2 g. of 6-amino-1,3-diethyl - 5 - nitrosouracil and 250 ml. of saturated aqueous sodium acetate at room temperature, is added, portionwise, 35 g. of sodium dithionite. The reaction mixture warms up and becomes a colorless solution which is cooled to 0° for dropwise addition of a solution of 25.6 g. of 3,4,5-trimethoxycinnamoyl chloride in 80 ml. of dioxane. The resulting mixture is stirred one more hour at 0–5° and then overnight at room temperature. The precipitate is collected by filtration, washed by water, and then suspended in 250 ml. of 1 N sodium hydroxide and 250 ml. of methanol. This suspension is stirred at reflux until a clear yellow solution of the sodium salt results ($\approx$ 2 hours) and then treated dropwise with 20 ml. of glacial acetic acid in 100 ml. of water. On cooling, the product, 1,3 - diethyl-8-(3,4,5-trimethoxystyryl)xanthine, separates and is collected, washed with 50% aqueous methanol and dried overnight in vacuo at 80°; M.P. 287–289° C.

Example 5

(a) A solution of 13 g. of 1-ethyl-3-methyl-8-styrylxanthine in 100 ml. of 1 N—NaOH, 50 ml. of methanol and 50 ml. of water, stirred vigorously at room temperature, is treated with 10 ml. dimethyl sulfate, added dropwise over a period of ten minutes. A precipitate appears and the stirring is continued for one hour. 50 ml. of 1 N—NaOH and 5 ml. of dimethyl sulfate are added and the stirring is continued for thirty minutes. The reaction mixture is basified with 50 ml. of 1 N—NaOH and the product, 1-ethyl-8-styryltheobromine, is collected and washed with water; M.P. 190–191° C. after recrystallization from dimethylformamide-water. Starting instead with 3-ethyl-1-methyl-8-styrylxanthine, the product obtained by this procedure is 1,7-dimethyl-3-ethyl-8-styrylxanthine.

(b) The starting material for the procedure of paragraph (a) is obtained as follows:

A mixture of 15.9 g. of 6-amino-3-ethyl-1-methyl-5-nitrosouracil (M.P. 247° C. with decomp.), 4.2 g. sodium carbonate and 250 ml. of saturated aqueous sodium acetate is stirred vigorously at room temperature while 28 g. of sodium dithionite is added in two portions. The color of the mixture changes from purple to white at the completion of the reduction. The mixture is cooled to −5° C. for the dropwise addition of a solution of 15 g. of cinnamoyl chloride in 70 ml. of dioxane over a period of thirty minutes. The stirring is continued at room temperature overnight. A white solid is collected, washed with water and some ether. The solid is then mixed with 250 ml. of 1 N—NaOH and 200 ml. of methanol. The resulting suspension is stirred at reflux for about two hours until a clear solution of the sodium salt results at which point it is treated dropwise with a mixture of 17 ml. of acetic acid in 50 ml. of water. On cooling, the product, 1-ethyl-3-methyl-8-styrylxanthine, is collected; M.P. 333–

335° C. after washing with water and methanol and drying overnight in vacuo at 80° C.

Example 6

(a) A slurry, resulting from addition of 50 ml. of methanol to a solution of 8 - (3,4,5-trimethoxystyryl)-theobromine (9.3 g.), sodium hydroxide (80 ml., 1 N aqueous), and water (80 ml.), is stirred at reflux and treated dropwise with 8 ml. of ethyl iodide. One hour after addition is complete, another 8 ml. of ethyl iodide and 50 ml. of 1 N aqueous sodium hydroxide are added. The resulting mixture is stirred first at reflux two hours and then at room temperature overnight. After dilution with 500 ml. of water and 50 ml. of 1 N sodium hydroxide, the reaction mixture is extracted three times with 300 ml. of methylene chloride. The extracts are combined, dried over anhydrous sodium sulfate, and concentrated in vacuo to provide the product, 1-ethyl-8-(3,4,5-trimethoxystyryl)theobromine; M.P. 220–222° C. after recrystallization of the residue from a 3:1 mixture of dimethylformamide:water. The corresponding 1-methyl analog can be prepared by the same procedure with an equivalent quantity of dimethyl sulfate as the alkylating agent in place of ethyl iodide.

(b) The starting material for the procedure of paragraph (a) can be prepared as follows: A suspension of 17 g. of 6-amino-1-methyl-5-methylaminouracil in 200 ml. of pyridine stirring at 0° C. is treated dropwise by a solution of 25.6 g. of 3,4,5-trimethoxycinnamoyl chloride and 80 ml. dioxane. After stirring overnight, the reaction mixture is concentrated in vacuo. The residue is triturated with 400 ml. water, neutralized with acetic acid, and then washed with water. A suspension of this product in 250 ml. water, 180 ml. of methanol and 10.6 g. of sodium carbonate is stirred at reflux until a clear solution forms. This usually requires about two hours. Upon cooling, this mixture is neutralized using carbon dioxide and filtered. The solid product is 3,4,5-trimethoxy-N-(6-amino,1,2,3,4-tetrahydro - 1 - methyl - 2,4 - dioxo-5-pyrimidinyl)-N-methyl - cinnamamide; M.P. 299–302° C. after washing with water.

A solution resulting from portionwise addition of 7.8 g. of 3,4,5 - trimethoxy - N - (6-amino-1,2,3,4-tetrahydro-1-methyl-2,4-dioxo-5-pyrimidinyl)-N - methylcinnamamide to 25 ml. of tetrahydrothiophene-1,1-dioxide (preheated to 280°) is refluxed thirty minutes (allowing water vapor to escape), cooled, and diluted with 75 ml. of ethanol. The precipitated solid is separated by filtration, washed with ethanol, and recrystallized from a 10:3 dimethylformamide:water mixture to yield 8-(3,4,5-trimethoxystyryl)theobromine; M.P. 293–295° C.

We claim:
1. 1,3-dialkylstyrylxanthines of formula

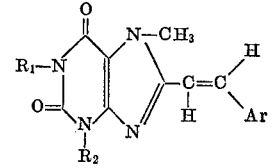

where $R_1$ and $R_2$ are methyl or ethyl and Ar is phenyl or 3,4,5-trimethoxyphenyl.

2. A compound according to claim 1 which is 8-styrylcaffeine.

3. A compound according to claim 1 which is 8-(3,4,5-trimethoxystyryl)caffeine.

4. A compound according to claim 1 which is 1,3-diethyl-7-methyl-8-styrylxanthine.

5. A compound according to claim 1 which is 1,3-diethyl-7-methyl-8-(3,4,5-trimethoxystyryl)xanthine.

6. A compound according to claim 1 which is 1-ethyl-8-styryltheobromine.

References Cited

Hager et al., J. Am. Pharm. Association, vol. 43, pp. 152–155 (1954).

Tsukerman et al., Chemistry of Heterocyclic Compounds (USSR), vol. 1, p. 537 (1965).

JOHN D. RANDOLPH, Primary Examiner

U.S. Cl. X.R.

260—999